United States Patent
Fang (10) Patent No.: US 8,908,749 B2
(45) Date of Patent: Dec. 9, 2014

(54) METHOD AND APPARATUS FOR CONTROLLING DSL LINE TRANSMISSION POWER

(75) Inventor: Liming Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1181 days.

(21) Appl. No.: 12/551,246

(22) Filed: Aug. 31, 2009

(65) Prior Publication Data

US 2010/0027601 A1 Feb. 4, 2010

Related U.S. Application Data

(63) Continuation of application No. PCT/CN2008/072342, filed on Sep. 11, 2008.

(30) Foreign Application Priority Data

Sep. 27, 2007 (CN) .......................... 2007 1 0152346

(51) Int. Cl.
| | |
|---|---|
| H04B 1/38 | (2006.01) |
| H04M 11/06 | (2006.01) |
| H04L 25/08 | (2006.01) |
| H04B 3/32 | (2006.01) |
| H04L 25/03 | (2006.01) |
| H04L 27/26 | (2006.01) |

(52) U.S. Cl.
CPC ............ H04L 25/085 (2013.01); H04L 27/2601 (2013.01); H04M 11/062 (2013.01); H04B 3/32 (2013.01); H04L 25/03828 (2013.01)
USPC ............ 375/222; 375/220; 375/254; 375/346

(58) Field of Classification Search
USPC .......................... 375/222, 219, 220, 254, 346
See application file for complete search history.

(56) References Cited

U.S. PATENT DOCUMENTS

| | | | |
|---|---|---|---|
| 2002/0041565 A1 | 4/2002 | Valenti et al. | |
| 2003/0235274 A1* | 12/2003 | Afzal | ........................... 379/1.04 |

(Continued)

FOREIGN PATENT DOCUMENTS

| | | |
|---|---|---|
| CN | 1866937 A | 11/2006 |
| CN | 1866938 A | 11/2006 |
| CN | 101174855 A | 5/2008 |

OTHER PUBLICATIONS

Written opinion of corresponding PCT Patent Application No. PCT/CN2008/072342, mailed Dec. 5, 2008, 4 pages total.

(Continued)

Primary Examiner — Eva Puente
(74) Attorney, Agent, or Firm — Leydig, Voit & Mayer, Ltd.

(57) ABSTRACT

A method for controlling DSL transmission power includes: determining a group to which a line belongs, and selecting a representative line from each group to form a line model; obtaining a crosstalk model of the line model; obtaining Transmit Power Spectrum Density (TxPSD) of each representative line in the line model according to the crosstalk model, and converting the TxPSD into a spectrum control parameter; and enhancing the line rate according to the spectrum control parameter. An apparatus for controlling DSL transmission power is also disclosed. Through the method, the transmission power of the band that incurs serious line crosstalk is restricted, and the line that incurs serious crosstalk can achieve higher transmission rates. Therefore, the adverse impact from the crosstalk between xDSL lines is reduced, and the line works in the optimum state.

15 Claims, 10 Drawing Sheets

(56) References Cited

U.S. PATENT DOCUMENTS

| | | | |
|---|---|---|---|
| 2004/0028189 A1* | 2/2004 | Bauer et al. | 379/1.01 |
| 2006/0098725 A1* | 5/2006 | Rhee et al. | 375/222 |
| 2006/0280237 A1* | 12/2006 | Rhee et al. | 375/222 |
| 2007/0004286 A1* | 1/2007 | Hobbel | 439/676 |
| 2007/0036207 A1 | 2/2007 | Wang | |

OTHER PUBLICATIONS

John Papandriopoulo, et al., "Low-Complexity Distributed Algorithms for Spectrum Balancing in Multi-user DSL Networks", IEEE ICC 2006 proceedings, Jun. 30, 2006, the whole document.

* cited by examiner

METHOD AND APPARATUS FOR CONTROLLING DSL LINE TRANSMISSION POWER

This application is a continuation of PCT patent application No. PCT/CN2008/072342 filed on Sep. 11, 2008, which claims priority to Chinese Patent Application No. 200710152346.3, filed with the Chinese Patent Office on Sep. 27, 2007 and entitled "Method and Device for Controlling Transmission Power of DSL", which is incorporated herein by reference in its entirety.

FIELD OF THE INVENTION

The present invention relates to communication technologies, and in particular, to a method and an apparatus for controlling transmission power of a Digital Subscriber Line (DSL).

Figure 1:
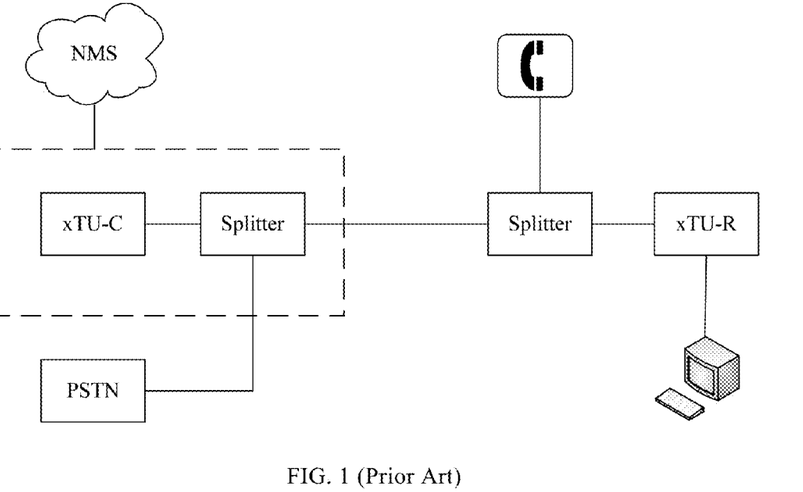
FIG. 1 shows a reference model of an xDSL system in the conventional art.

BACKGROUND OF THE INVENTION xDSL is a high-speed data transmission technology for transmitting data over a telephone twisted pair, and comes in two types: DSL which transmits data through baseband, and xDSL which transmits data through passband based on the Frequency Division Multiplexing (FDM) technology. xDSL which transmits data through passband adopts Discrete Multitone Modulation (DMT). A system that provides multiple channels of xDSL access is called as a Digital Subscriber Line Access Multiplexer (DSLAM), whose system reference model is shown in FIG. 1.

Figure 2:
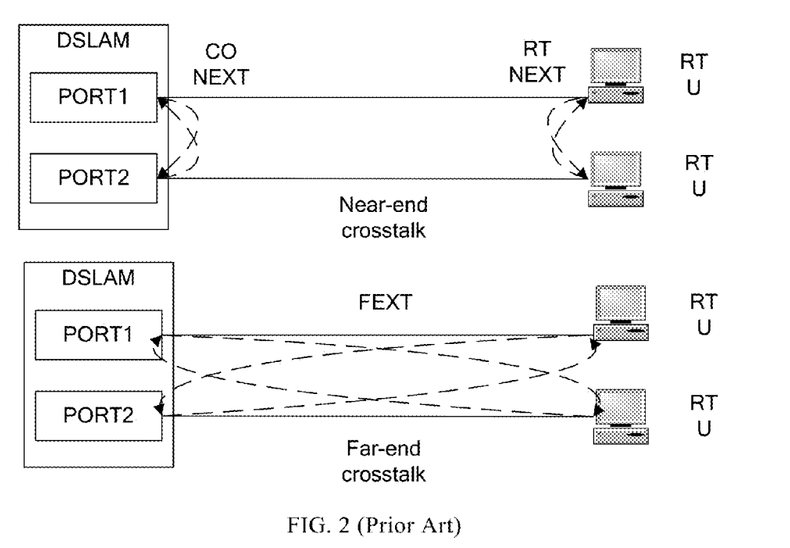
FIG. 2 shows a schematic diagram about crosstalk in the conventional art.

Currently, the xDSL technology uses higher and higher frequency bands. Therefore, crosstalk, especially crosstalk on a high frequency band, is more and more noticeable, as shown in FIG. 2. Because the FDM technology is applied to the uplink and downlink channels of the xDSL, near-end crosstalk does not considerably impair the system performance. However, far-end crosstalk deteriorates the transmission performance of the line seriously. When multiple subscriber lines in a bundle of cables need to activate the xDSL service, some lines suffer from low line rates and instable performance or even service activation failure due to the far-end crosstalk, such that the line activation rate of the DSLAM is low.

A subscriber cable generally contains multiple (25 or more) twisted pairs. Different services may run over different twisted pairs. When different xDSL lines work at the same time, crosstalk occurs, and the performance of some lines is deteriorated drastically. As a result, no DSL service can be activated on a long DSL line.

Figure 3:
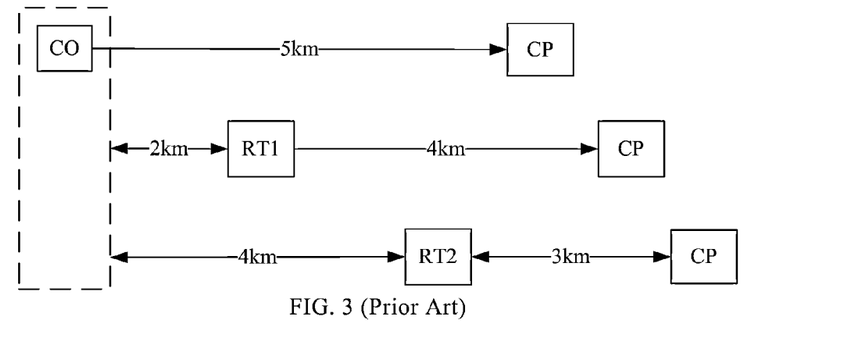
FIG. 3 shows a schematic diagram of a user scenario in the conventional art.

To avoid serious line performance deterioration caused by crosstalk, the International Telecommunication Union-Telecommunication Standardization Sector (ITU-T) proposes a Dynamic Spectrum Management (DSM) solution. The DSM solution aims to enhance the rate, distance and stability of the line by balancing the spectrum dynamically, or send signals at the lowest power while the performance and stability requirements (rate, noise tolerance, and bit error rate) are fulfilled. Through a series of methods, various parameter configurations and the signal Power Spectral Density (PSD) are managed in a centralized and optimized way. Moreover, the transmitting and the receiving of the signals in a whole bundle of cables are coordinated to optimize the line transmission performance. Specifically, DSM eliminates crosstalk by adjusting the transmission power on each modem in the network automatically. Especially in the case that the Central Office (CO) and the Remote Terminal (RT) are mixed, and a short line generates much crosstalk to a long line. As shown in FIG. 3, the impact imposed by line 2 onto line 1 is far greater than the impact imposed by line 1 onto line 2. DSM aims to achieve a balance between maximization of the rate of each modem and minimization of the crosstalk onto other modems by adjusting the transmission power.

Figure 4:
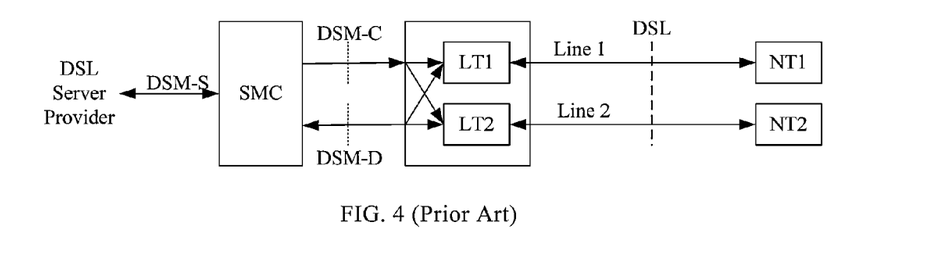
FIG. 4 shows a DSM reference model in the conventional art.

FIG. 4 shows a main structure of the first layer of present DSM in the conventional art, which includes a controller: Spectrum Maintenance Center (SMC), and three control interfaces: DSM-S, DSM-C, and DSM-D. The SMC reads parameters such as the working state of the DSL from the DSL-LT through the DSM-D interface, and exchanges information with the correlated SMC through the DSM-S interface. After obtaining sufficient information, the SMC performs a series of optimization calculations, and finally delivers control parameters to the DSL-LT through the DSM-C so that the line works in the best state.

A centralized frequency management algorithm in the first conventional art is Optimum Spectrum Balancing (OSB). It is supposed that N users exist in total, each with K tones, and that N−1 of the users have a target rate. The basic issue of DSM is: on the precondition of fulfilling the rate of the N−1 users, the rate of the first user is increased to the utmost; the energy of each signal needs to meet the PSD requirement; and the total power of each user needs to meet the corresponding constraint $$\sum_{k=1}^{K} s_k^n \le P_n,$$

where $P_n$ is the maximum allowable transmission power of n users). Due to non-convexity of this issue, it is necessary to enumerate all possible $s_k^n$ values to work out a complete solution directly. Therefore, the algorithm has the complexity of calculation using both the user quantity (N) and the tone quantity (K) as an exponent, namely, $O(e^{KN})$. Through a duality method, OCB expresses the foregoing issue as:

$$J = \max_{s_1,\ldots,s_N} R_1 + \sum_{n=2}^{N} w_n R_n - \sum_{n=1}^{N} \sum_{k=1}^{K} \lambda_n s_k^n \quad (1)$$

s.t. $0 \le s_k^n \le s_{max}$, $k = 1, \ldots, K$; $n = 1, \ldots, N$

The target function in formula (1) may be converted into:

$$J = \sum_{k=1}^{K} b_k^1 + \sum_{n=2}^{N} \sum_{k=1}^{K} w_n b_k^n - \sum_{n=1}^{N} \sum_{k=1}^{K} \lambda_n s_k^n \quad (2)$$

$$= \sum_{k=1}^{K} \left( \sum_{n=1}^{N} (w_n b_k^n - \lambda_n s_k^n) \right)$$

$$= \sum_{k=1}^{K} J_k$$

$$J_k = \sum_{n=1}^{N} (w_n b_k^n - \lambda_n s_k^n) \quad (3)$$

In the above formulas, $w_1=1$. Considering that $J_k$ is related only to the power allocation $s_k^1, s_k^2, \ldots, s_k^N$ on tone k and is unrelated to the power allocation on other tones, the maximum value of $J_k$ can be calculated out by enumerating the power allocation of all users on tone k only.

The optimum solution to J can be obtained by calculating max $J_k$ for each independent tone. OSB reduces the calculation complexity to $O(Ke^N)$ while ensuring availability of the optimum solution.

The implementation process of OSB is detailed below.

For each tone k, $(s_k^1, s_k^2, \ldots, s_k^N)=\arg\max J_k$, $k=1, 2, \ldots, K$ is calculated.

For each user n, $$w_n = \left[w_n + \varepsilon_n\left(R_n^{target} - \sum_{k=1}^{K} b_k^n\right)\right]^+, n = 2, 3, \ldots, N$$

and $$\lambda_n = \left[\lambda_n + \varepsilon_\lambda\left(\sum_{k=1}^{K} s_k^n - P_n\right)\right]^+, n = 1, 2, \ldots, N$$

are calculated.

The foregoing processes are repeated until the function converges.

At the time of calculating $s_k^1, s_k^2, \ldots, s_k^N$ which makes $J_k$ maximum, no simple analytical solution exists because $J_k$ is a non-convex function.

Therefore, to obtain the optimum solution to $s_k^1, s_k^2, \ldots, s_k^N$, all $s_k^n$ values need to be enumerated on the space of $[0, s_{max}]^N$. After a round of enumeration is completed, $w_n$ and $\lambda_n$ are adjusted dynamically according to the extent of fulfilling the constraint conditions. If a constraint condition is already fulfilled, it is necessary to decrease the value of $w_n$ or $\lambda_n$ on the corresponding subscriber line to reduce the impact of this constraint condition on the whole target function. If a constraint condition is not fulfilled, it is necessary to increase the value of $w_n$ or $\lambda_n$ on the corresponding subscriber line to increase the weight of this constraint condition in the whole target function. The algorithm repeats the foregoing operations until all constraint conditions are fulfilled and the power allocation never changes again. In this circumstance, the algorithm can be regarded as having converged.

The OSB algorithm can obtain a calculation result within an acceptable time range when the user quantity "N" is not too large. However, when the user quantity increases, the calculation time increases exponentially. In a word, the merits of the OSB algorithm are optimum, and, when N is small, computability. OSB provides high performance, but it is too complex and not user-definable, and requires a central manager to exchange data. Therefore, OSB is not practical at all. Many quasi-optimum algorithms are derived from OSB, for example, Iterative Spectrum Balancing (ISB). Compared with OSB, such algorithms are much simpler, but still involve a huge calculation burden in the practical work, especially when many lines exist.

A distributed frequency management algorithm available in the second conventional art is Iterative Water Filling (IWF).

IWF is a greedy algorithm. It considers only the impact of the $s_k^n$ change on the rate of line n, without considering interference onto other lines from the optimization perspective.

The target function $J_k$ of IWF may be expressed as $J_k \cong J_k^n = w_n b_k^n - \lambda_n s_k^n$.

The implementation process of IWF is detailed below.

The following process is performed for each user n (n=1, 2, \ldots, N).

For each tone k, $S_k^m$, $\forall m \ne n$, is fixed, and $w_m = 0$, $\forall m \ne n$, is supposed; $s_k^n = \arg\max(w_n b_k^n - \lambda_n s_k^n)$ is calculated.

If $$\sum_{k=1}^{K} s_k^n > P_n, \quad \lambda_n = \left[\lambda_n + \varepsilon\left(\sum_{k=1}^{K} s_k^n - P_n\right)\right]^+$$

is executed; otherwise, $$\lambda_n = \left[\lambda_n + \varepsilon\left(\sum_{k=1}^{K} b_k^n - R_n^{target}\right)\right]^+$$

is executed until the function converges.

IWF is less complex, and is still computable if the values of N and K are large. Moreover, IWF is completely autonomous. That is, each user needs to optimize only their own rate and fulfill their own power constraint, without requiring different users to exchange data. In other words, no central manager is required. Therefore, IWF is easily practicable in the actual system. However, IWF is a greedy algorithm. Its performance is low when the crosstalk environment is complex, and cannot ensure the optimum solution or quasi-optimum solution.

SUMMARY OF THE INVENTION

A method and apparatus for controlling DSL transmission power are provided in embodiments of the present invention to restrict the transmission power of the signals on the band that incurs serious line crosstalk and to enhance the rate and stability of the line.

To achieve the foregoing objectives, a method for controlling DSL transmission power is provided in an embodiment of the present invention. The method includes: determining a group to which a line belongs, and selecting a representative line from each group to form a line model; obtaining a crosstalk model of the line model; obtaining Transmit Power Spectrum Density (TxPSD) of each representative line in the line model according to the crosstalk model, and converting the TxPSD into a spectrum control parameter; and enhancing the line rate according to the spectrum control parameter.

An apparatus for controlling DSL transmission power is provided in an embodiment of the present invention. The device includes: a line grouping unit, adapted to determine a group to which a line belongs; a line model generating unit, adapted to: select a representative line from each group according to the group provided by the line grouping unit, to generate a line model, and send the line model to a crosstalk model obtaining unit; the crosstalk model obtaining unit, adapted to: obtain the crosstalk model of the line model provided by the line model generating unit, and send the crosstalk model to a TxPSD obtaining unit; the TxPSD obtaining unit, adapted to: obtain TxPSD of the representative line in the line model according to the crosstalk model provided by the crosstalk model obtaining unit, and send the TxPSD to a converting unit and a processing unit; the converting unit, adapted to convert the TxPSD of the representative line provided by the TxPSD obtaining unit into a spectrum control parameter; and the processing unit, adapted to: optimize the spectrum control parameter and enhance the line rate through a specific optimization algorithm according to the spectrum control parameter provided by the converting unit.

The embodiments of the present invention provide the following benefits: through the method disclosed herein, the transmit power of the band that incurs serious line crosstalk is restricted, and the line that incurs serious crosstalk can achieve higher transmission rates. Therefore, the adverse impact from the crosstalk between xDSL lines is reduced, and the line works in the optimum state.

DETAILED DESCRIPTION OF THE INVENTION

The embodiments of the present invention are detailed below with reference to accompanying drawings.

Figure 5:
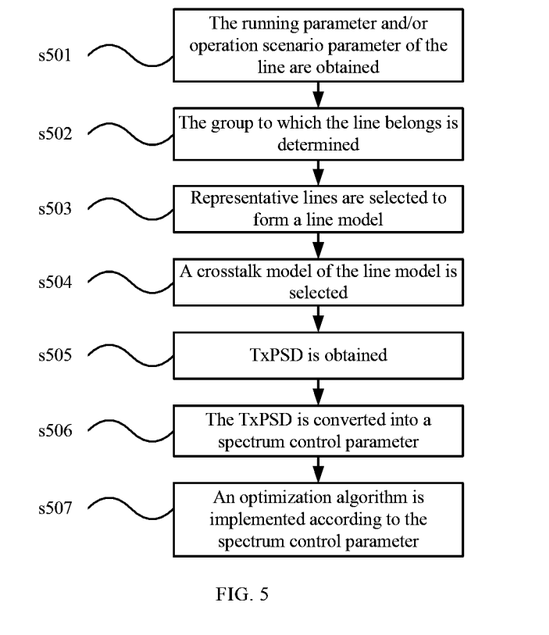
FIG. 5 is a flowchart of a method for controlling transmission power of a DSL line in a first embodiment of the present invention.

FIG. 5 is a flowchart of a method for controlling transmission power of a DSL line in the first embodiment of the present invention. The detailed steps are as follows.

Step s501: The running parameter and/or operation scenario parameter of the line are obtained.

Step s502: The group to which the line belongs is determined according to the parameter.

Specifically, the principle of determining the group to which the line belongs is to make the lines in a group have the same features, for example, electrical (line) length thereof being approximately the same; the crosstalk between every two lines is basically the same.

Step s503: A representative line is selected out of each group. The selected representative lines make up a line model.

The representative line is any line in the group, or a line with an average value of all lines in the group, for example, the line with an average electrical length in the group.

Step s504: The crosstalk model of the line model is obtained.

Step s505: The optimized Transmission Power Spectrum Density (TxPSD) of the line model is obtained through a Dynamic Spectrum Management (DSM) optimization algorithm according to the crosstalk model.

Specifically, the optimized TxPSD of each representative line in the line model is obtained by using a DSM algorithm such as Iterative Spectrum Balancing (ISB), Linear Programming Method (LPM), and Successive Spectrum Balancing (SSB).

Step s506: The TxPSD is converted into a spectrum control parameter.

Specifically, the spectrum control parameter is a parameter that can control the TxPSD, for example, a parameter that represents the corresponding PSDMASK (power spectrum density mask) or stop-band PSD (forbidden band of PSD) of the line.

Step s507: The optimization algorithm is implemented according to the spectrum control parameter, to obtain the optimum transmission power of the line.

Specifically, the optimization algorithm is an IWF algorithm, or a dynamic reconfiguration function of the line. The transmission power spectrum of the band that generates strong crosstalk onto other lines is restricted by the PSD-MASK or forbidden by the stop-band PSD. Therefore, the crosstalk between every two lines is approximately the same. In a mutual contending process, no line takes the absolute superiority. That is, all the lines are under relatively fair conditions. Experience and emulation results show that when all the lines are under relatively fair conditions, a good result can be achieved and the rate is enhanced maximally by using the IWF algorithm or the IWF-like dynamic reconfiguration function of the line.

Through the method provided in the foregoing embodiment, the transmission power of the band that incurs serious line crosstalk is restricted, and the line that incurs serious crosstalk can achieve higher transmission rates. Therefore, the adverse impact from the crosstalk between xDSL lines is reduced, and the line works in the optimum state.

Figure 6:
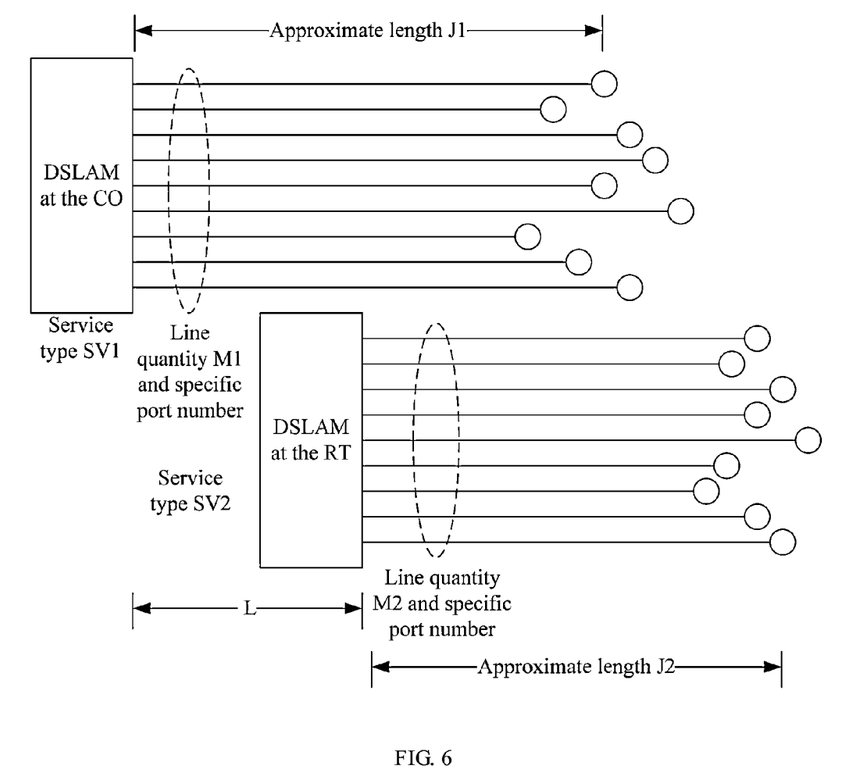
FIG. 6 shows parameters of a typical scenario in a second embodiment of the present invention.
Figure 7:
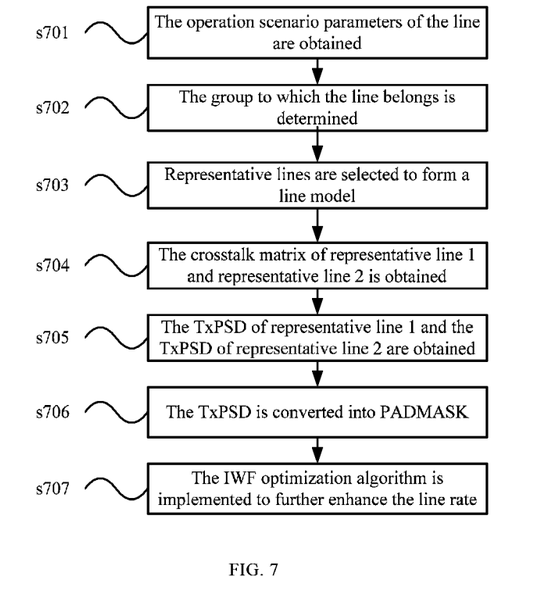
FIG. 7 is a flowchart of a method for controlling transmission power of a DSL line in the second embodiment of the present invention.

FIG. 7 shows a method for controlling transmission power of a DSL line in the second embodiment of the present invention, taking the scenario shown in FIG. 6 as an example. The detailed steps are as follows.

Step s701: The operation scenario parameters of the line are obtained.

Generally, the operation scenario parameters shown in FIG. 6 can be obtained. In a specific circumstance, more parameters may be obtained, for example, port number of the line (or location information of the DSLAM, board location information, and port information); the corresponding service type (ADSL, ADSL2, ADSL2+, and VDSL2); quantity of lines in different locations; approximate length of the lines in different locations; distance between the central office and the remote terminal, and the like.

Step s702: The group to which the line belongs is determined according to the start point of the line.

Specifically, the group to which the line belongs is determined according to whether the start point of the line is the central office or the remote terminal. In the operation scenario shown in FIG. 6, the lines are divided into two groups. Furthermore, if more remote terminals exist, the lines may be divided into more groups according to the details of the remote terminals.

Step s703: A representative line is selected out of each group, and the selected representative lines make up a line model.

Figure 8:
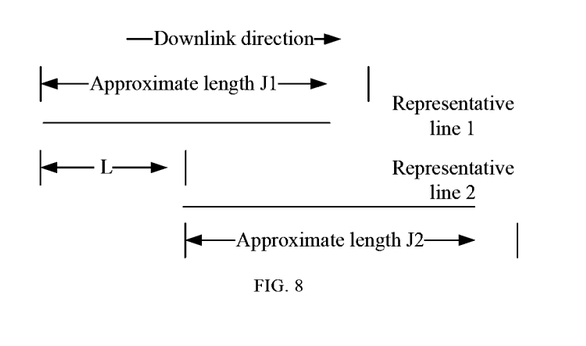
FIG. 8 illustrates line grouping in the second embodiment of the present invention.

The representative line is any line in the group, or a line with an average value of all lines in the group, for example, the line with an average electrical length in the group. As shown in FIG. 8, representative line 1 and representative line 2 are selected out of the corresponding groups.

Step s704: A crosstalk matrix of representative line 1 and representative line 2 in the line model is obtained.

Specifically, the detailed steps of obtaining the crosstalk matrix are as follows.

The crosstalk ($h_{21}$) of line 1 onto line 2 is equal to the attenuation of the line length (L) plus the crosstalk of the coupling length (J1−L), and plus the attenuation of the line length (J2+L−J1), where L is the distance between the remote terminal and the central office, J1 is the approximate length of line 1, and J2 is the approximate length of line 2. Supposing the model of the function for calculating the attenuation of the twisted pair is S(1) and the model of the function for calculating the crosstalk of the twisted pair is C(1), the foregoing step may be expressed as:

$$h_{21} = S(L) + C(J_1 - L) + S(J_2 + L - J_1) dB \quad (4).$$

Likewise, the crosstalk of representative line 2 onto representative line 1 is: $h_{12} = C(J_1 - L)$ dB; the crosstalk of representative line 1 onto the representative line 1 itself is: $h_{11} = S(J_1)$ dB; the crosstalk of representative line 2 onto the representative line 2 itself is: $h_{22} = S(J_2)$ dB. In addition, other models of the twisted pair attenuation function and the twisted pair crosstalk function are available, and may also be applied here.

Through the foregoing step, the crosstalk matrix of the representative line is obtained.

Step s705: The optimized TxPSD 1 of representative line 1 and the optimized TxPSD 2 of representative line 2 are obtained.

It can be shown from the crosstalk matrix obtained in step s704 that the crosstalk of representative line 2 onto representative line 1 is obviously more serious than the crosstalk of representative line 1 onto representative line 2. As representative line 2 is obviously superior in the contending process, the use of the IWF algorithm provided in the second conventional art does not enhance the rate of representative line 1 noticeably. That is because representative line 2 does not make representative line 1 achieve greater rates at the cost of reducing the rate of representative line 2 itself. Moreover, the use of the OSB optimization method in the first conventional art calculates the TxPSD 1 and TxPSD 2 to achieve the optimum entirety on the whole, and representative line 2 surely sends less power on some frequencies that impose a high impact on representative line 1. In this embodiment, therefore, the TxPSD of representative line 1 and the TxPSD of representative line 2 are calculated through the OSB optimization method provided in the first conventional art.

Step s706: The TxPSD is converted into a spectrum control parameter PSDMASK.

If the obtained TxPSD is converted into PSDMASK, the transmission power of the frequencies band with serious crosstalk can be restricted. The formula for conversion between TxPSD and PSDMASK is:

$$PSDMASK_1 = TXPSD_1 + TJ_1;\ PSDMASK_2 = TXPSD_2 + TJ_2 \quad (5)$$

$TJ_1$ and $TJ_2$ are regulating amounts while considering the actual circumstance. For example, while considering the PSD margin, a positive or negative regulating constant (for example, 3 dB or −3 dB) is added on the basis of the original TxPSD. In addition, the regulating amount, or a variable dependent on the obtained TxPSD, may be expressed as TJ (TxPSD). For example, a piecewise function as follow is formulated to express TJ to enhance the restriction of the TxPSD in the case that the crosstalk is not serious:

$$TJ = \begin{cases} 0 & \text{if } TxPSD < A \\ 3 & \text{if else} \end{cases} dB \quad (6)$$

In the above piecewise function, A is a set threshold, which is generally an average of statistic data.

Step s707: The spectrum control parameter PSDMASK is optimized through an IWF algorithm to enhance the transmission power of the line.

Figure 9:
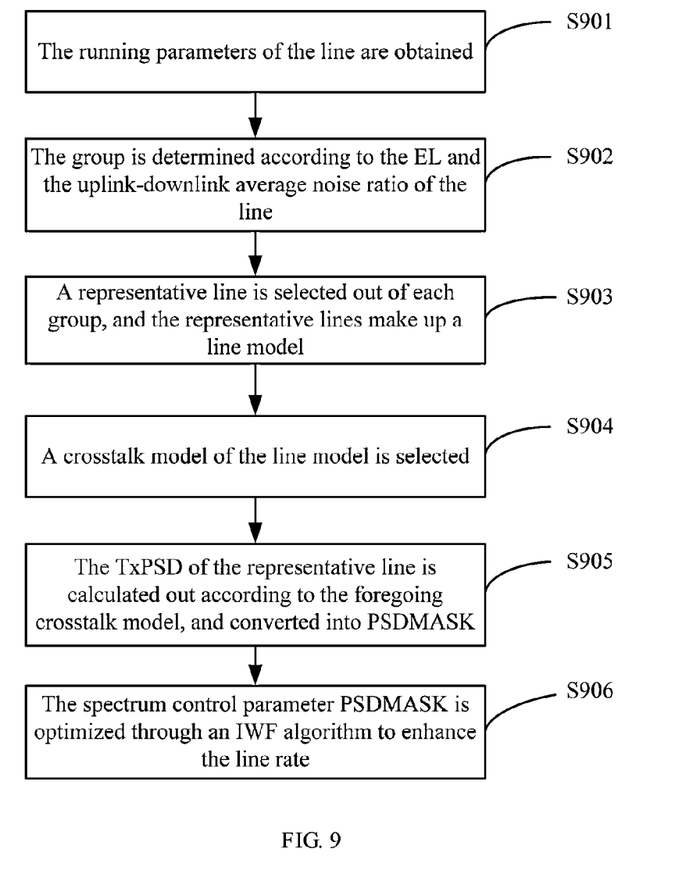
FIG. 9 is a flowchart of a method for controlling transmission power of a DSL line in a third embodiment of the present invention.

FIG. 9 shows a method for controlling transmission power of a DSL line in the third embodiment of the present invention. The detailed steps are as follows.

Step s901: The running parameters of the line are obtained.

In the running process of the line, the following parameters can be obtained: electrical length (EL) of the line, line attenuation ($H_{log}$), uplink transmission power of the line ($S_{up}$), downlink transmission power of the line ($S_{dn}$), receiver Signal-to-Noise Ratio ($SNR_{up}$, $SNRD_{dn}$) of the line, and static noise (QLN) of the line.

Step s902: The group to which the line belongs is determined according to the EL and the uplink-downlink Average Noise Ratio (ANR) of the line.

The ANR may be obtained through formula (7):

$$ANR = \frac{N_{dn} \sum_{n}^{N_{up}} QLN_{up}(n)}{N_{up} \sum_{n}^{N_{dn}} QLN_{dn}(n)} \quad (7)$$

or through formula (8):

$$ANR = \frac{N_{dn} \sum_{n}^{N_{up}} (S_{up}(n) - SNR_{up}(n) - H_{log}(n))}{N_{up} \sum_{n}^{N_{dn}} (S_{dn}(n) - SNR_{dn}(n) - H_{log}(n))} \quad (8)$$

In the above formulas, $N_{dn}$ is the quantity of bands applied in the downlink direction, and $N_{up}$ is the quantity of bands applied in the uplink direction.

The lines with the equivalent or approximate EL and ANR are put into the same group.

Step s903: A representative line is selected out of each group, and the selected representative lines make up a line model.

Figure 10:
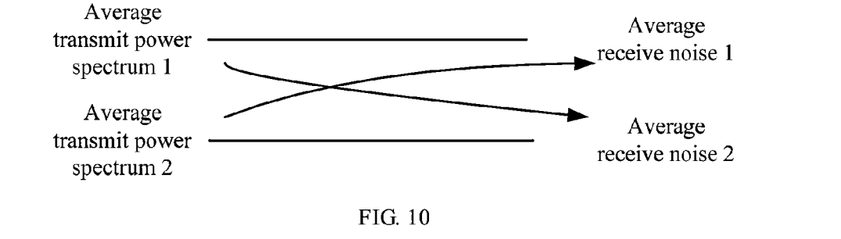
FIG. 10 is a flowchart of obtaining a crosstalk matrix in the third embodiment of the present invention.

After a whole group of the lines is divided into multiple line groups according to the EL and the ANR, one of the lines in each group is selected out as a representative line to represent the corresponding group, as shown in FIG. 10.

Step s904: The crosstalk model of the line model is obtained.

Specifically, the average transmission power spectrum and the average receiving noise spectrum of each representative line are obtained, and the crosstalk model of the line model is obtained according to such data. The crosstalk of representative line 1 onto representative line 2 is the difference between the average receiving noise spectrum 2 and the average transmission power spectrum 1 in FIG. 10. The crosstalk of representative line 2 onto representative line 1 is the difference between the average receiving noise spectrum 1 and the average transmission power spectrum 2.

Step s905: The TxPSD of the representative line is calculated out according to the foregoing crosstalk model, and then is converted into PSDMASK. The detailed implementation process is similar to steps 705-706 in the second embodiment, and is not described further.

Step s906: The spectrum control parameter PSDMASK is optimized through an IWF algorithm to enhance the line rate.

Figure 11:
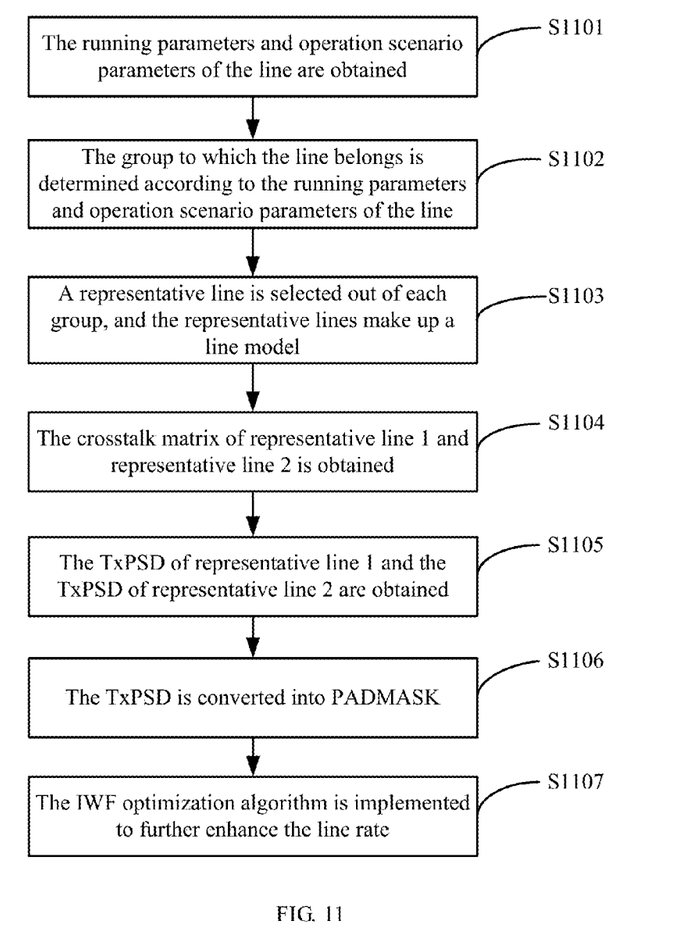
FIG. 11 is a flowchart of a method for controlling transmission power of a DSL line in a fourth embodiment of the present invention.

FIG. 11 shows a method for controlling transmission power of a DSL line in the fourth embodiment of the present invention. The detailed steps are as follows.

Step s1101: The running parameters and operation scenario parameters of the line are obtained.

At the time of obtaining the line parameters to determine the group, the operation scenario parameters and the running parameters may be considered together. The running parameters provide more precise data for the operation scenario parameters. For example, the operation scenario parameters give only an approximate length of the line, and cannot determine the specific length of each line. However, the EL provided by the running parameters or deduced from the line attenuation is rather precise.

Step s1102: The group to which the line belongs is determined according to the running parameters and operation scenario parameters of the line.

For example, in the second embodiment, the group to which the line belongs is determined according to the location (for example, CO and RT) of the line. The group at the CO or RT level may further be subdivided into smaller groups according to the length and the running parameters of the line.

Step s1103: A representative line is selected out of each group. The representative lines make up a line model.

Steps s1104-s1107: These steps are similar to steps s704-s707 in the second embodiment, and are not described further.

Figure 12:
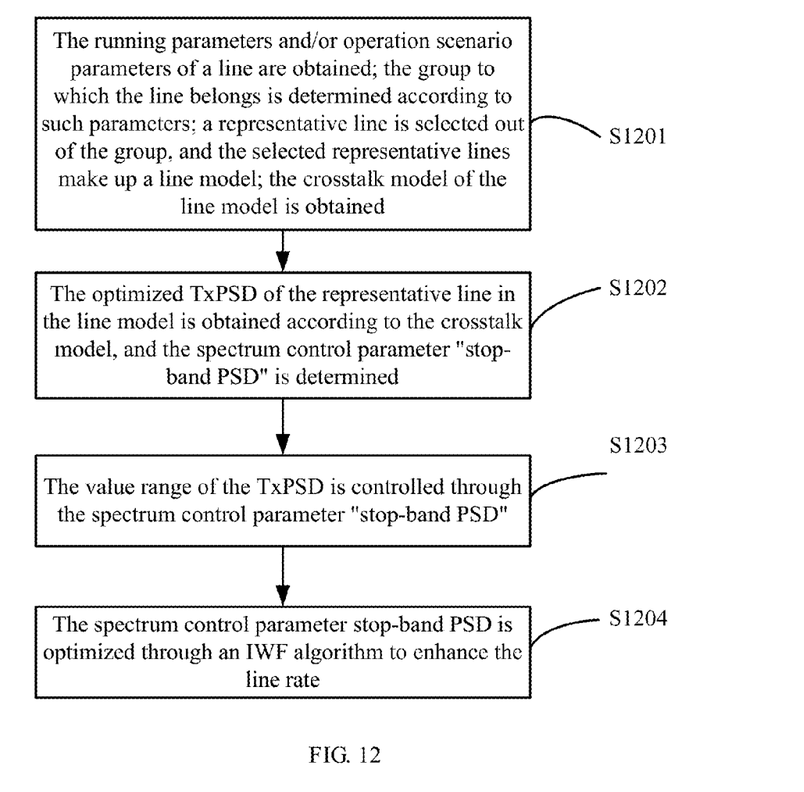
FIG. 12 is a flowchart of a method for controlling transmission power of a DSL line in a fifth embodiment of the present invention.

FIG. 12 shows a method for controlling transmission power of a DSL line in the fifth embodiment of the present invention. The detailed steps are as follows.

Step s1201: The running parameters and/or operation scenario parameters of a line are obtained. The group to which the line belongs is determined according to such parameters. A representative line is selected out of each group, and the selected representative lines make up a line model. Moreover, a crosstalk model of the line model is obtained.

The details of the foregoing step are the same as those in the second, third, or fourth embodiment, and are not described further.

Step s1202: The optimized TxPSD of the representative line in the line model is obtained according to the crosstalk model, and the spectrum control parameter "stop-band PSD" is determined.

The process of determining the stop-band PSD according to the TxPSD is as follow. A threshold M is set; if the TxPSD is less than the threshold, the frequency interval lower than the threshold is set as the stop-band PSD. The stop-band PSD is clearly defined in the ITU-T G.993.2. The threshold M is generally an average of statistic data.

Step s1203: The value range of the TxPSD is controlled through the spectrum control parameter "stop-band PSD".

Step s1204: The spectrum control parameter "stop-band PSD" is optimized through an IWF algorithm to enhance the line rate.

Figure 13:
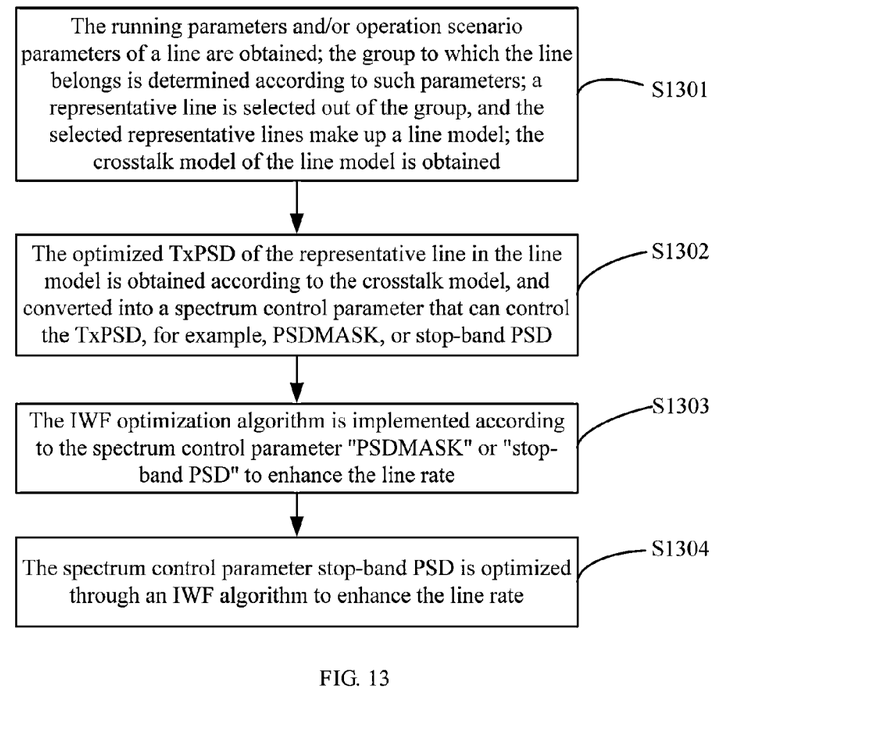
FIG. 13 is a flowchart of a method for controlling transmission power of a DSL line in a sixth embodiment of the present invention.

FIG. 13 shows a method for controlling transmission power of a DSL line in the sixth embodiment of the present invention. The detailed steps are as follows.

Step s1301: The running parameters and/or operation scenario parameters of a line are obtained. The group to which the line belongs is determined according to such parameters. A representative line is selected out of each group, and the selected representative lines make up a line model. Moreover, a crosstalk model of the line model is obtained.

The details of the foregoing step are the same as those in any of the second to fifth embodiments, and are not described further.

Step s1302: The optimized TxPSD of the representative line in the line model is obtained according to the crosstalk model, and converted into a spectrum control parameter that can control the TxPSD, for example, PSDMASK, or stop-band PSD.

The details of the foregoing step are the same as those in the second, third, fourth, or fifth embodiment, and are not described further.

Step s1303: The TWF optimization algorithm is implemented according to the spectrum control parameter "PSDMASK" or "stop-band PSD" to enhance the line rate.

The TxPSD on each representative line is optimized through the TWF algorithm under the restriction of the foregoing PSDMASK or stop-band PSD to enhance the line rate.

Through the method provided in the foregoing embodiment, the transmit power spectrum of the frequency band that generates serious crosstalk onto other lines is restricted by the PSDMASK or forbidden by the stop-band PSD. Therefore, the crosstalk between every two lines is approximately the same. In the mutual contending process, no line takes the absolute superiority. That is, all the lines are under relatively fair conditions. Experience and emulation results show that when all the lines are under relatively fair conditions, a good result can be achieved and the rate is enhanced maximally by using the IWF algorithm.

Figure 14:
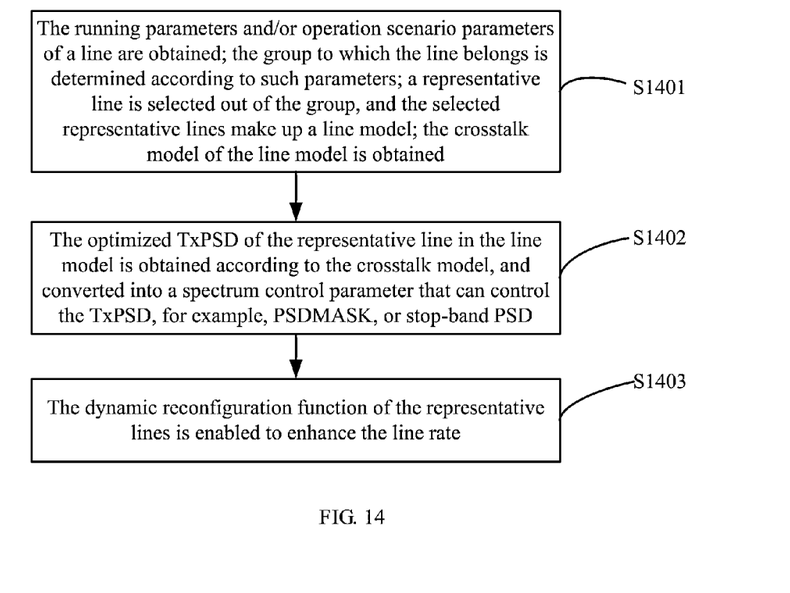
FIG. 14 is a flowchart of a method for controlling transmission power of a DSL line in a seventh embodiment of the present invention.

FIG. 14 shows a method for controlling transmission power of a DSL line in the seventh embodiment of the present invention. The detailed steps are as follows.

Step s1401: The running parameters and/or operation scenario parameters of a line are obtained. The group to which the line belongs is determined according to such parameters. A representative line is selected out of each group, and the selected representative lines make up a line model. Moreover, a crosstalk model of the line model is obtained.

The crosstalk model of the line model is obtained in the way described in any of the second to sixth embodiments.

Step s1402: The optimized TxPSD of the representative line in the line model is obtained according to the crosstalk model, and converted into a spectrum control parameter that can control the TxPSD, for example, PSDMASK, or stop-band PSD.

The details of the foregoing step (namely, obtaining the spectrum control parameter that controls the TxPSD) are the same as those in any of the second to sixth embodiments, and are not described further.

Step s1403: The dynamic reconfiguration function of the representative lines is enabled to enhance the line rate.

The dynamic reconfiguration function of the representative lines is enabled according to the parameters obtained in step s1401 and step s1402, for example, Seamless Rate Adaptive (SRA), and Bit Swap. Such functions implement a water refilling process of the line. With the accumulation of time, the indirect effect of such functions is equivalent to IWF. In this way, the rate of the line model is enhanced maximally on the whole.

Figure 15:
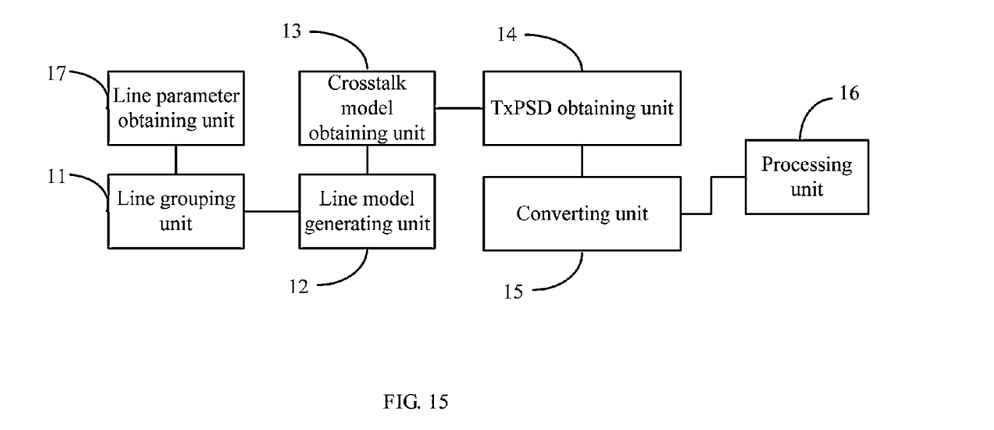
FIG. 15 is an apparatus for controlling transmission power of a DSL line an eighth embodiment of the present invention.

FIG. 15 shows a device for controlling transmission power of a DSL line in the eighth embodiment of the present invention. The device includes:

a line grouping unit 11, adapted to determine a group to which a line belongs according to line parameters;

a line model generating unit 12, adapted to: select a representative line of each group according to the group provided by the line grouping unit 11, generate a line model, and send the line model to a crosstalk model obtaining unit 13;

the crosstalk model obtaining unit 13, adapted to: obtain the crosstalk model of the line model provided by the line model generating unit 12, and send the crosstalk model to a TxPSD obtaining unit 14;

the TxPSD obtaining unit 14, adapted to: obtain TxPSD representative of the line in the line model through a DSM optimization algorithm according to the crosstalk model provided by the crosstalk model obtaining unit 13, and send the TxPSD to a converting unit 15;

the converting unit 15, adapted to: convert the TxPSD that is representative of the line and provided by the TxPSD obtaining unit 14 into a spectrum control parameter, and send the converted TxPSD to a processing unit 16; and the processing unit 16, adapted to optimize the spectrum control parameter and enhance the line rate through a specific optimization algorithm according to the spectrum control parameter provided by the converting unit 15.

The device further includes: a line parameter obtaining unit 17, adapted to: obtain the running parameters and/or operation scenario parameters of the line, and send the parameters to the line grouping unit 11.

Through the device provided in the foregoing embodiment, the transmit power of the band that incurs serious line crosstalk is restricted, and the line that incurs serious crosstalk can achieve higher transmission rates. Therefore, the adverse impact from the crosstalk between xDSL lines is reduced, and the line works in the optimum state.

After reading the foregoing embodiments, those skilled in the art are clearly aware that the present invention may be implemented through hardware, or through software in addition to a necessary universal hardware platform. Therefore, the technical solution under the present invention may be embodied as a software product. The software product may be stored in a non-volatile storage medium (such as a CD-ROM, a USB flash disk, or a mobile hard disk), and may include several instructions that enable a computer device (such as a personal computer, a server, or a network device) to perform the methods provided in the embodiments of the present invention.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A method for controlling Digital Subscriber Line (DSL) transmission power, comprising:
   determining, by a spectrum maintenance center, a group to which a line belongs, and selecting a representative line from each group to form a line model;
   obtaining a crosstalk model of the line model;
   obtaining Transmit Power Spectrum Density (TxPSD) of each representative line in the line model according to the crosstalk model;
   converting the TxPSD into a spectrum control parameter; and
   adjusting a line rate according to the spectrum control parameter;
   wherein the step of converting the TxPSD into the spectrum control parameter comprises:
   converting the TxPSD into the spectrum control parameter that is capable of controlling the TxPSD of the representative line, wherein the spectrum control parameter comprises a power spectrum density mask (PSDMASK), and the PSDMASK is a sum of the TxPSD and a specific regulating amount.

2. The method of claim 1, wherein the step of determining of the line group comprises:
   obtaining at least one operation scenario parameter of the line; and
   determining the group to which the line belongs according to the at least one operation scenario parameter of the line.

3. The method of claim 1, wherein the step of determining of the line group comprises:
   obtaining at least one running parameter of the line; and
   determining the group to which the line belongs according to the at least one running parameter of the line.

4. The method of claim 1, wherein the step of determining of the line group comprises:
   obtaining at least one operation scenario parameter and at least one running parameter of the line; and
   determining the group to which the line belongs according to the at least one operation scenario parameter and the at least one running parameter of the line.

5. The method of claim 1, wherein the step of obtaining TxPSD of each representative line in the line model according to the crosstalk model comprises:
   obtaining the TxPSD of each representative line in the line model through a Dynamic Spectrum Management (DSM) optimization algorithm according to the crosstalk model.

6. A method for controlling Digital Subscriber Line (DSL) transmission power, comprising:
   determining, by a spectrum maintenance center, a group to which a line belongs, and selecting a representative line from each group to form a line model;
   obtaining a crosstalk model of the line model;
   obtaining Transmit Power Spectrum Density (TxPSD) of each representative line in the line model according to the crosstalk model;
   converting the TxPSD into a spectrum control parameter; and
   adjusting a line rate according to the spectrum control parameter;
   wherein the step of converting the TxPSD into the spectrum control parameter comprises:
   converting the TxPSD into the spectrum control parameter that is capable of controlling the TxPSD of the representative line, wherein the spectrum control parameter comprises stop-band Power Spectrum Density (PSD), and the stop-band PSD is a frequency interval lower than a preset threshold.

7. The method of claim 1, wherein the step of enhancing of the line rate according to the spectrum control parameter comprises:
   executing an optimization algorithm for the spectrum control parameter to enhance the line rate, wherein the optimization algorithm comprises an Iterative Water Filling (IWF) algorithm.

8. The method of claim 1, wherein the step of enhancing of the line rate according to the spectrum control parameter comprises:
  executing an optimization algorithm for the spectrum control parameter to enhance the line rate, wherein the optimization algorithm comprises a dynamic reconfiguration of the line.

9. An apparatus for controlling Digital Subscriber Line (DSL) transmission power, comprising:
  a line grouping unit configured to determine a group to which a line belongs;
  a line model generating unit configured to select a representative line from each group according to the group provided by the line grouping unit and to generate a line model;
  a crosstalk model obtaining unit configured to obtain a crosstalk model of the line model received from the line model generating unit;
  a Transmit Power Spectrum Density (TxPSD) obtaining unit configured to obtain the TxPSD of the representative line in the line model according to the crosstalk model received from the crosstalk model obtaining unit;
  a converting unit configured to convert the TxPSD of the representative line received from the TxPSD obtaining unit into a spectrum control parameter, wherein the converting unit converts the TxPSD into a power spectrum density mask (PSDMASK), and the PSDMASK is a sum of the TxPSD and a specific regulating amount; and
  a processing unit configured to optimize the spectrum control parameter and enhance the line rate through a specific optimization algorithm according to the spectrum control parameter received from the converting unit.

10. The apparatus of claim 9, further comprising:
  a line parameter obtaining unit configured to obtain at least one running parameter of the line and send the at least one running parameter to the line grouping unit.

11. The apparatus of claim 9, further comprising:
  a line parameter obtaining unit configured to obtain at least one operation scenario parameter of the line and send the at least one operation scenario parameter to the line grouping unit.

12. The apparatus of claim 9, further comprising:
  a line parameter obtaining unit configured to obtain at least one running parameter and at least one operation scenario parameter of the line and send the at least one running parameter and at least one operation scenario parameter to the line grouping unit.

13. An apparatus for controlling Digital Subscriber Line (DSL) transmission power, comprising:
  a line grouping unit configured to determine a group to which a line belongs;
  a line model generating unit configured to select a representative line from each group according to the group provided by the line grouping unit and to generate a line model;
  a crosstalk model obtaining unit configured to obtain a crosstalk model of the line model received from the line model generating unit;
  a Transmit Power Spectrum Density (TxPSD) obtaining unit configured to obtain the TxPSD of the representative line in the line model according to the crosstalk model received from the crosstalk model obtaining unit;
  a converting unit configured to convert the TxPSD of the representative line received from the TxPSD obtaining unit into a spectrum control parameter; and
  a processing unit configured to optimize the spectrum control parameter and enhance the line rate through a specific optimization algorithm according to the spectrum control parameter received from the converting unit; wherein:
  the TxPSD obtaining unit obtains the TxPSD of each representative line through a Dynamic Spectrum Management (DSM) optimization algorithm; and
  the converting unit converts the TxPSD into stop-band Power Spectrum Density (PSD), and the stop-band PSD is a frequency interval lower than a preset threshold.

14. A method for controlling transmission power of a Digital Subscriber Line (DSL), comprising:
  providing, by a spectrum maintenance center, a line model comprising representative lines corresponding to a plurality of digital subscriber lines;
  obtaining a crosstalk model corresponding to the line model;
  generating a spectrum control parameter based on Transmit Power Spectrum Density (TxPSD) of the representative lines; and
  adjusting a rate of the line according to the spectrum control parameter;
  wherein the step of generating a spectrum control parameter comprises:
  obtaining TxPSD of each representative line in the line model according to the crosstalk model; and
  converting the TxPSD into a power spectrum density mask (PSDMASK) by adding a specific regulating amount to the TxPSD with a specific regulating amount.

15. A method for controlling transmission power of a Digital Subscriber Line (DSL), comprising:
  providing, by a spectrum maintenance center, a line model comprising representative lines corresponding to a plurality of digital subscriber lines;
  obtaining a crosstalk model corresponding to the line model;
  generating a spectrum control parameter based on Transmit Power Spectrum Density (TxPSD) of the representative lines; and
  adjusting a rate of the line according to the spectrum control parameter; wherein:
  the step of providing a line model comprises:
  grouping the digital subscriber lines according to parameters thereof; and
  selecting a representative line from each group to form a line model; and
  the step of generating a spectrum control parameter comprises:
  obtaining TxPSD of each representative line in the line model according to the crosstalk model; and
  converting the TxPSD into top-band Power Spectrum Density (PSD) by determining whether the TxPSD is less than a preset threshold, and if so, configuring a frequency interval lower than the threshold as the stop-band PSD.

* * * * *